United States Patent [19]
Spaulding et al.

[11] Patent Number: 5,581,371
[45] Date of Patent: Dec. 3, 1996

[54] ERROR DIFFUSION METHOD

[75] Inventors: Kevin E. Spaulding, Spencerport; Douglas W. Couwenhoven, Fairport, both of N.Y.

[73] Assignee: Eastman Kodak Company, Rochester, N.Y.

[21] Appl. No.: 399,678

[22] Filed: Mar. 7, 1995

[51] Int. Cl.$^6$ ................................ H04N 1/405
[52] U.S. Cl. ................. 358/456; 358/443; 358/457
[58] Field of Search ..................... 358/447, 448, 358/443, 456–459, 298, 455; 382/260, 265, 270; H04N 1/40, 1/405

[56] References Cited

U.S. PATENT DOCUMENTS

| | | | |
|---|---|---|---|
| 4,654,721 | 3/1987 | Goertzel et al. | |
| 4,920,501 | 4/1990 | Sullivan et al. | 358/457 |
| 5,051,844 | 9/1991 | Sullivan | 358/456 |
| 5,070,413 | 12/1991 | Sullivan et al. | 358/443 |
| 5,343,309 | 8/1994 | Roetling | 358/443 |
| 5,387,987 | 2/1995 | Ino | 358/456 |
| 5,473,439 | 12/1995 | Pappas | 358/443 |

*Primary Examiner*—Kim Vu
*Attorney, Agent, or Firm*—Raymond L. Owens

[57] ABSTRACT

An improved error diffusion method for producing an output image from an input image having a set of digitized continuous-tone pixels is disclosed. The method includes computing a visually perceived input value for a digitized continuous-tone input pixel and computing a visually perceived output value for each of the possible output levels. The method further includes selecting the output level in response to the visually perceived input values and the visually perceived output value for each of the possible output levels according to an error criterion; determining an error signal between the visually perceived input value and the visually perceived output value for the selected output level; and weighting the error signal and adjusting the computed visually perceived input values for nearby pixels which have not been processed.

14 Claims, 11 Drawing Sheets

| -0.009 | -0.010 | 0.004 | 0.021 | 0.004 | -0.010 | -0.009 |
|---|---|---|---|---|---|---|
| -0.010 | -0.018 | 0.007 | 0.051 | 0.007 | -0.018 | -0.010 |
| 0.004 | 0.007 | 0.079 | 0.190 | 0.079 | 0.007 | 0.004 |
| 0.021 | 0.051 | 0.190 | 0.368 | | | |

| -0.002 | -0.002 | -0.002 | -0.002 | -0.001 | 0.000 | 0.002 | 0.003 | 0.002 | 0.000 | -0.001 | -0.002 | -0.002 |
|---|---|---|---|---|---|---|---|---|---|---|---|---|
| -0.003 | -0.003 | -0.003 | -0.003 | -0.002 | 0.001 | 0.004 | 0.006 | 0.004 | 0.001 | -0.002 | -0.003 | -0.002 |
| -0.003 | -0.004 | -0.005 | -0.005 | -0.003 | 0.001 | 0.007 | 0.010 | 0.007 | 0.001 | -0.003 | -0.004 | -0.002 |
| -0.005 | -0.005 | -0.005 | -0.004 | -0.002 | 0.002 | 0.011 | 0.017 | 0.011 | 0.002 | -0.003 | -0.005 | -0.003 |
| -0.004 | -0.005 | -0.004 | -0.003 | -0.002 | 0.007 | 0.022 | 0.031 | 0.022 | 0.007 | -0.002 | -0.005 | -0.003 |
| -0.003 | -0.002 | -0.001 | 0.001 | 0.007 | 0.020 | 0.043 | 0.057 | 0.043 | 0.020 | 0.007 | -0.003 | -0.002 |
| 0.000 | 0.001 | 0.002 | 0.007 | 0.022 | 0.043 | 0.076 | 0.096 | 0.076 | 0.043 | 0.022 | 0.001 | 0.000 |
| 0.002 | 0.004 | 0.007 | 0.011 | 0.031 | 0.057 | 0.096 | 0.118 | | | | | |
| 0.003 | 0.005 | 0.010 | 0.017 | | | | | | | | | |

ERROR DIFFUSION METHOD

FIELD OF THE INVENTION

The present invention relates to digital image processing and more particularly to a method for digitally halftoning a continuous-tone image using error diffusion.

BACKGROUND OF THE INVENTION

Digital halftoning is a technique employing digital image processing to produce a halftone output image from a continuous-tone input image. In the digital halftoning technique, a continuous-tone image is sampled, for example, with a scanner and the samples are digitized and stored in a computer. The digitized samples (or "pixels") consist of discrete values typically ranging from 0 to 255. To reproduce this image on an output device capable of printing dots of one gray level (e.g. black) it is necessary to create the sensation of multiple gray levels by suitably distributing the printed dots in the output image. This is accomplished by converting the continuous-tone image to a binary output image using some form of halftoning technique.

One prior art method of digital halftoning is known as error diffusion. FIG. 1 shows a block diagram describing a basic error diffusion technique. The continuous-tone input value for column i, and row j of the input image is given by $y_{i,j}$. For purposes of illustration it will be assumed that the continuous-tone input values span the range from 0 to 255. The continuous-tone input value for the current input pixel is thresholded 10 to form the output value $b_{i,j}$. The threshold operator will return a 0 for any continuous-tone input value below the threshold, and a 255 for any continuous-tone input value above the threshold. A difference signal generator 12 receives the continuous-tone input value and the output value, and produces a difference signal representing the error introduced by the thresholding process. The difference signal is multiplied by a series of error weights using a weighted error generator 14, and is provided to an adder 16 which adds the weighted difference signal to the continuous-tone input values of nearby pixels which have yet to be processed to form modified continuous-tone input values. The propagation of the errors made during the quantization process to the nearby pixels insures that the arithmetic mean of the pixel values is preserved over a local image region.

FIG. 2 illustrates a typical set of error weights 14 which can be used to distribute the errors to the nearby pixels.

FIG. 3 shows a typical image generated using this simple error diffusion technique.

An artifact that is typically associated with error diffusion halftoning techniques is known as "worms." Worms are formed when the black or white output pixels appear to string together in an area which should be otherwise uniform. Worm artifacts can be clearly seen in several areas of the sample image shown in FIG. 3, such as the light and dark ends of the gray wedge. Several of these worm artifacts are labeled as 18A–C. Many modifications to the basic error diffusion technique have been described which attempt to eliminate these worm artifacts. One such modification has been described by Goertzel et al. in U.S. Pat. No. 4,654,721 issued Mar. 31, 1987. In their disclosure, each input pixel is represented by a block of output pixels. The appearance of worms is avoided by employing a random number generator to determine the distribution of error between two adjacent blocks of pixels, such that a random fraction of error is distributed to one block and the remainder of the error is distributed to the other. In another technique, sometimes called error diffusion with dither, the error criterion is randomly varied to reduce the appearance of worms. Although these techniques, and others like them, reduce the appearance of worms, they also increase the random noise in the output image. To the extent that this random noise occurs in the frequencies visible to the human viewer, the image is thereby degraded.

A more desirable approach has been disclosed by Sullivan (U.S. Pat. No. 5,051,844 issued Sep. 24, 1991). This method will be referred to as visual error diffusion. Sullivan teaches the use of a visual filter derived from the response of the human visual system to compute a visually perceived output value. The output level is chosen which gives the smallest error between the continuous-tone input value and the visually perceived output value. The error signal which is propagated to the nearby image pixels is then computed by taking the difference between the continuous-tone input value and the visually perceived output value rather than the output value itself. FIG. 4 illustrates a flow diagram for this method. The simple threshold 10 in the conventional error diffusion method has been replaced by a selector 30 which determines the output pixel value $b_{i,j}$. The selection by the selector 30 is made by using a causal visual filter 31 to filter the previously computed output pixel values together with each of the possible output levels for the current pixel 32 to compute the visually perceived output value for each possible output level. For a binary output device there will be two possible output levels corresponding to a black or a white pixel, but this method can be extended to multi-level output devices by considering more than two possible output levels. The output pixel value is chosen which gives the smallest difference between the continuous-tone input value and the visually perceived output level. The resulting error is then calculated for the current pixel by a difference signal generator 33 which computes a difference signal between the continuous-tone input value and the visually perceived output value 34. As with the conventional error diffusion technique, this difference signal is then weighted by a series of error weights $W_{i,j}$ using a weighted error generator 35, and is added 36 to the continuous-tone input values of nearby pixels which have yet to be processed to form modified continuous-tone input values. The causal visual filter function is computed from the frequency response of the human visual system as described by Sullivan. An example of a 4×7 causal visual filter function is shown in FIG. 5. The array element 40 is used to weight the possible output levels for the present pixel, and the remaining array elements are used to weight the nearby output values which have been previously computed. (This causal visual filter function is a normalized version of the one disclosed by Sullivan.) A similar 8×15 causal visual filter function is shown in FIG. 6. The size of the causal visual filter function array is related to the parameters such as viewing distance and sample spacing on the document in the equations given by Sullivan. In this case, the array element 42 is used to weight the possible output levels for the present pixel, and the remaining array elements are used to weight the nearby output values which have been previously computed. FIG. 7 shows a sample image generated using this technique with the 8×15 causal visual filter function. The worm artifacts 18A–C which were shown in FIG. 3 have been eliminated.

Although visual error diffusion has the result of reducing the appearance of worms to a large degree without the introduction of undesirable noise, a side effect of this method is that artifacts are generated near edges, lines, and isolated pixels in the image. One type of artifact can be referred to as "ghost pixels." Examples of ghost pixels artifacts 20A–C can be observed around the isolated pixels and the edges in the image shown in FIG. 7. The origin of these ghost pixel artifacts can be traced to the fact that the selection process is comparing the visually perceived output image to the unfiltered input image. So, for example, consider the case where the input image contains an isolated black pixel on a white background. The visual error diffusion technique will place white pixels in most of the area corresponding to the white background, but when it comes time to make a selection for the black pixel it will visually filter the output pixels in the surrounding area. Since most of these pixels will be white, the visually perceived output level for a white output pixel will be white, but the visually perceived output level for a black output pixel will be light gray rather than black. Since the light gray visually perceived output level will be closer to the desired black input level than the white visually perceived output level, the correct black output level will be chosen. However, the resulting error signal corresponding to the difference between the black input level and the light gray visually perceived output level will be quite large. This error will then be propagated to the surrounding continuous-tone input pixels. As a result, when the nearby white background pixels are processed, one or more of these pixels may be rendered as black output pixels.

The artifacts can be even more severe on edges between uniform patches of different gray levels where anisotropic overshoots are formed. Although this artifact has a sharpening effect on the image, it is not necessarily desirable because the degree of sharpening can not be controlled independent of the worm reduction, and additionally the effect is anisotropic so that the apparent sharpening is not symmetric. Examples of the anisotropic sharpening of edges 19A and B can be seen in FIG. 7. As with the ghost pixel artifacts, the origin of the anisotropic sharpening artifacts can be traced to the fact that the selection process is comparing the visually perceived output image to the unfiltered input image.

SUMMARY OF THE INVENTION

It is an object of the present invention to eliminate the above-discussed artifacts while simultaneously maintaining the benefits, such as worm reduction, associated with visual error diffusion.

This object is achieved in an improved error diffusion method for producing an output image from an input image having a set of digitized continuous-tone pixels, comprising the steps of:

a) computing a visually perceived input value for a digitized continuous-tone input pixel;

b) computing a visually perceived output value for each of the possible output levels;

c) selecting the output level in response to the visually perceived input values and the visually perceived output value for each of the possible output levels according to an error criterion;

d) determining an error signal between the visually perceived input value and the visually perceived output value for the selected output level; and e) weighting the error signal and adjusting the computed visually perceived input values for nearby pixels which have not been processed.

This invention represents an improved error diffusion technique for the purpose of digitally halftoning images. With this method a causal visual filter function is applied to both the input and output images during the process of determining the output value for the current pixel. The error which is propagated to nearby continuous-tone input pixels which have not been processed yet is calculated by the difference between the visually perceived input value and the visually perceived output value.

ADVANTAGES

The present invention has the advantage that it minimizes the appearance of worm artifacts in the output image while eliminating the artifacts associated with the prior art visual error diffusion systems.

Another advantage of the present invention is that it permits the amount of sharpening to be adjusted independent of the parameters used for the visual filtering. Additionally, the sharpening effect can be made to be isotropic.

BRIEF DESCRIPTION OF THE DRAWINGS

FIG. 6 depicts another causal visual filter array;

DETAILED DESCRIPTION OF THE INVENTION

In the present invention, the artifacts associated with the visual error diffusion system disclosed by Sullivan are eliminated by applying a visual filter to the continuous-tone input pixels as well as the output pixels. As a result, the visually perceived output values are compared to the visually perceived input values rather than the input values themselves during the output pixel selection step, and the error calculation step. This is shown schematically in FIG. 8.

Figure 1:
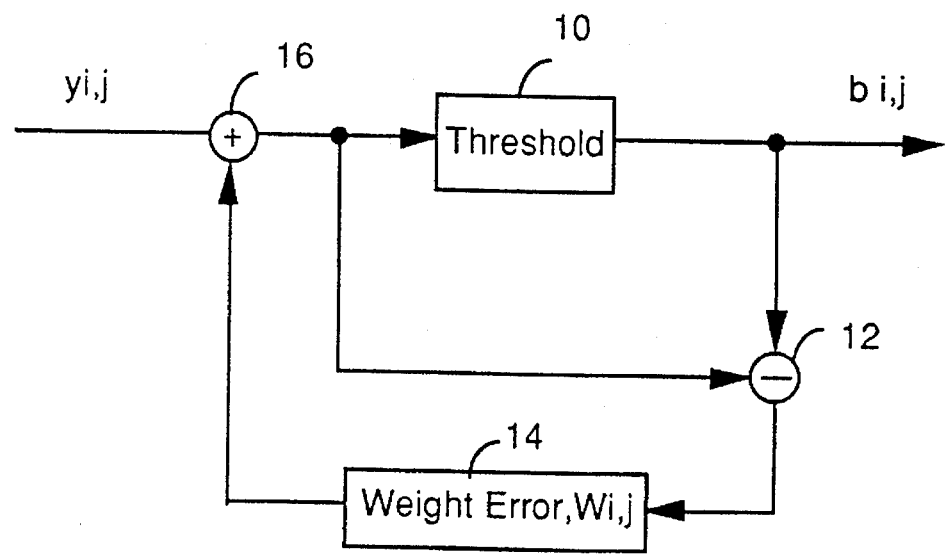
FIG. 1 is a logic diagram of a prior error diffusion process.
Figure 2:
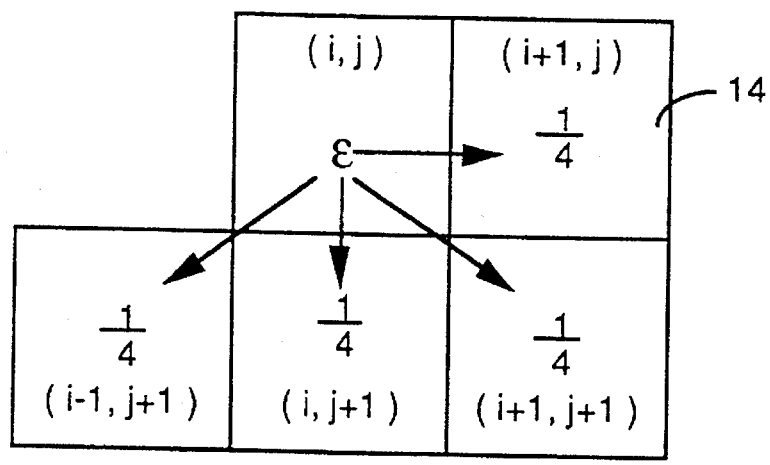
FIG. 2 shows typical sets of error weights used in the FIG. 1 arrangement.
Figure 3:
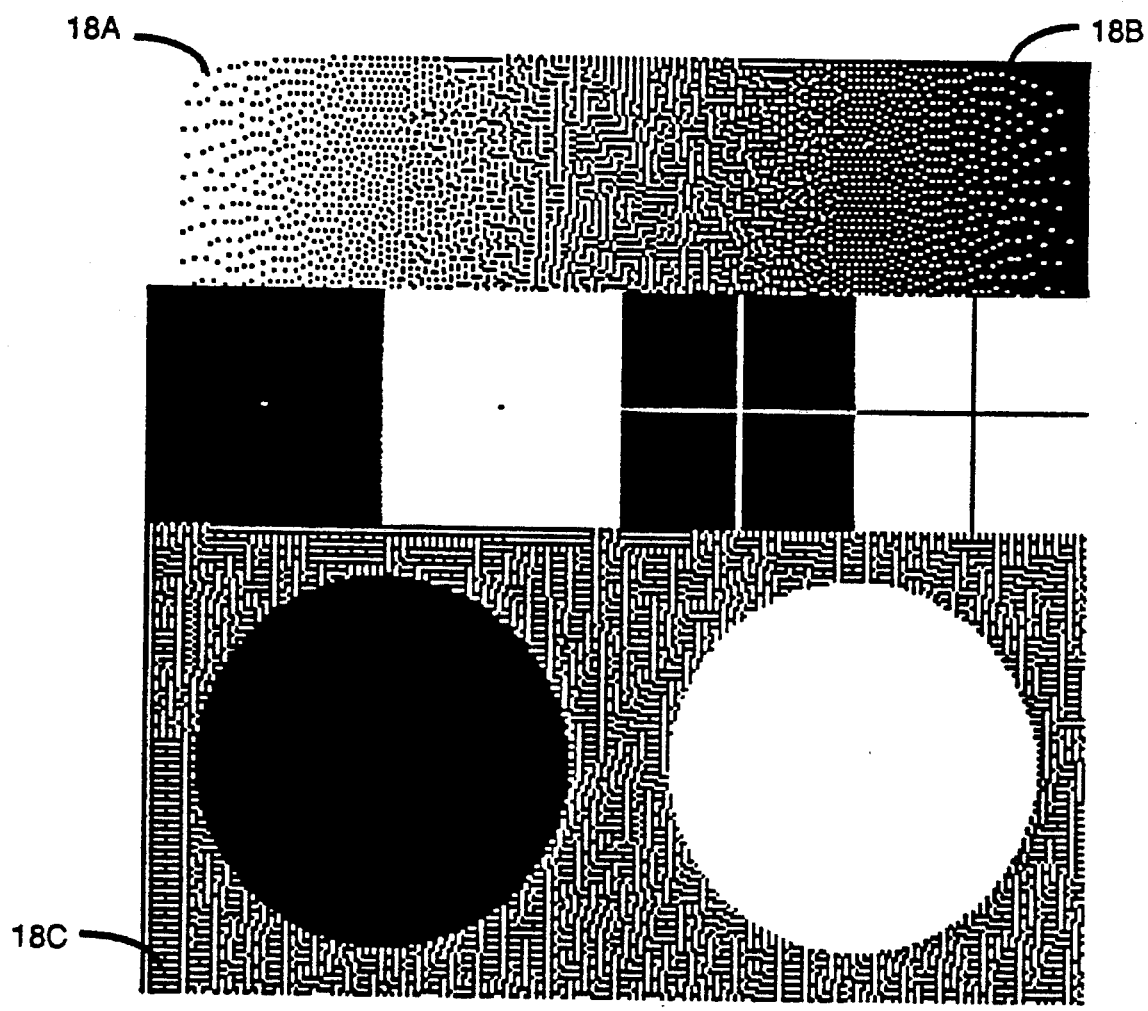
FIG. 3 depicts a sample image generated in accordance with the method of FIG. 1 which contains worm artifacts.
Figures 4, 5:
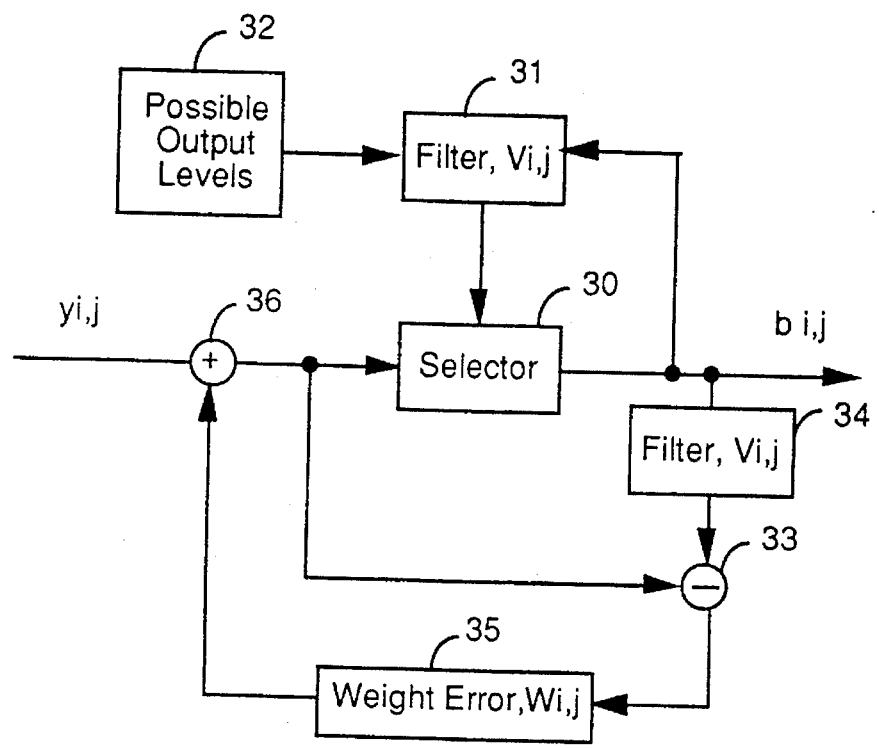
FIG. 4 is another logic diagram of a prior error diffusion process.
FIG. 5 depicts a causal visual filter array.
Figure 7:
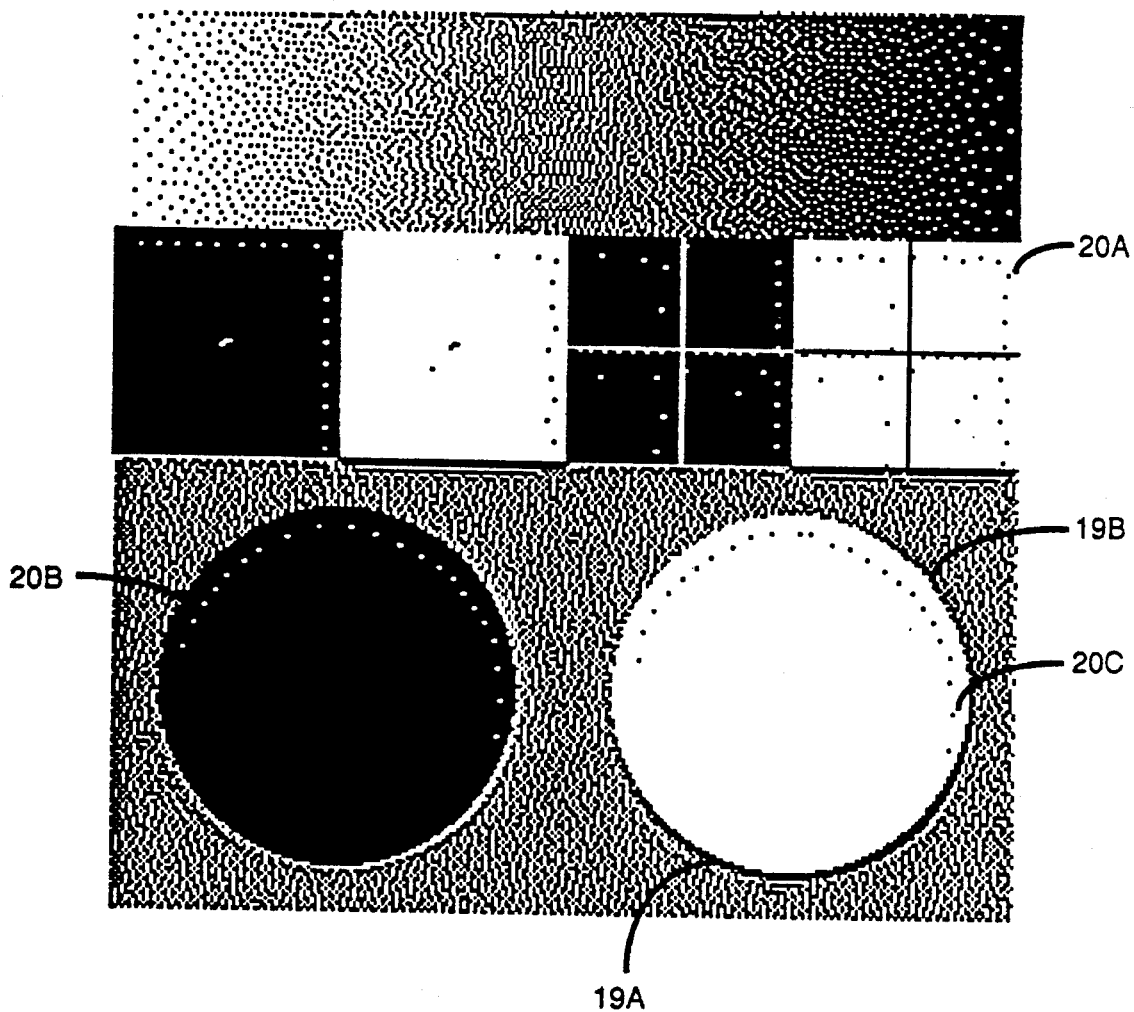
FIG. 7 depicts a sample image generated in accordance with the method of FIG. 4 which contains anisotropic edge sharpening and ghost pixel artifacts.
Figure 8:
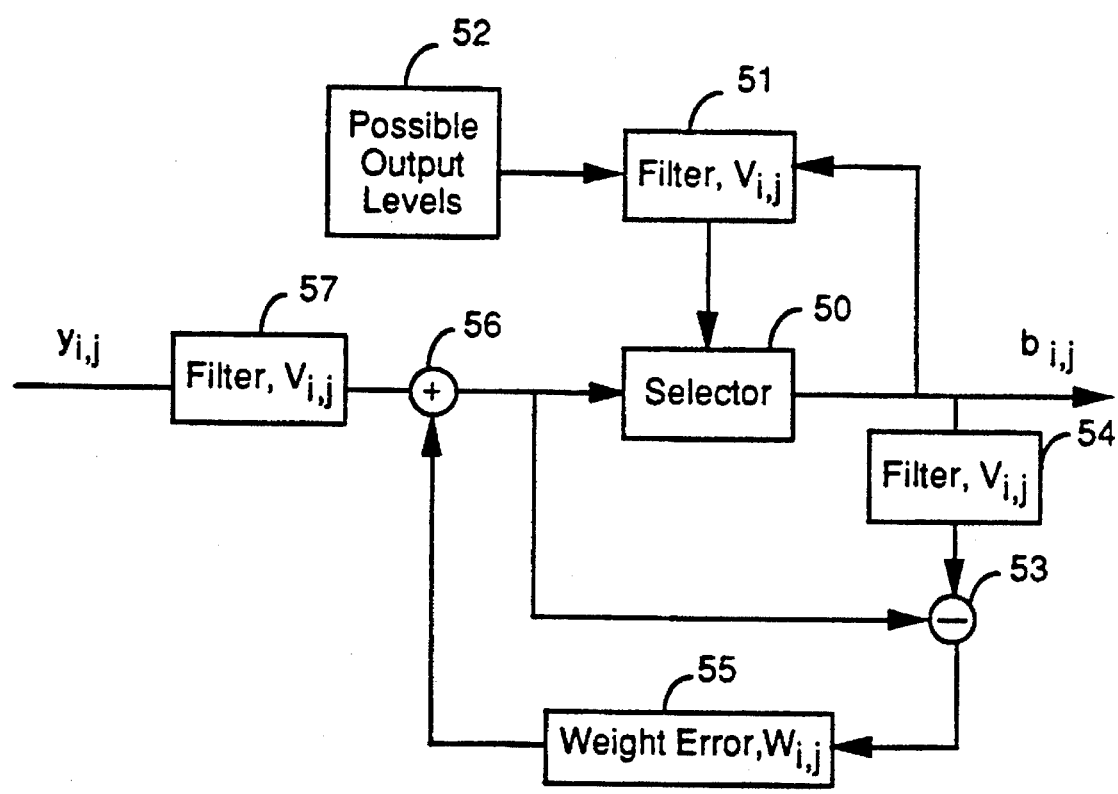
FIG. 8 is a logic diagram showing a method according to the present invention.

With reference to FIG. 8, the present invention can be seen to be somewhat similar to the Sullivan process shown in FIG. 4 with the exception that a visual filter 57 is applied to the continuous-tone input pixels to compute visually perceived input values. The selection of the output pixel value is made by using a causal visual filter 51 to filter the previously computed output pixel values along with each of the possible output levels for the current pixel 52 to compute the visually perceived output value for each of the possible output levels. In many cases it is desirable to generate the visually perceived input and output values using the same visual filter. For a binary output device there will be two possible output levels corresponding to a black or a white pixel, but this method can be extended to multi-level output devices by considering more than two possible output levels. The error criterion is such that the output pixel level is chosen which gives the smallest error between the visually perceived input value and the visually perceived output value. The resulting error is then calculated by a difference signal generator 53 which computes the difference between the visually perceived input value and the visually perceived output value. A weighted error generator 55 weights the error by a series of error weights $W_{i,j}$. The weighted errors are then added by an adder 56 to adjust the visually perceived input values of nearby pixels which have yet to be processed to form modified visually perceived input values. The result of visually filtering the continuous-tone input values as well as the output values is that the calculated errors now represent the true visually perceived difference between the input image and the output image. This eliminates the anisotropic sharpening artifact as well as the "ghost pixels" associated with Sullivan's visual error diffusion system.

Figure 9:
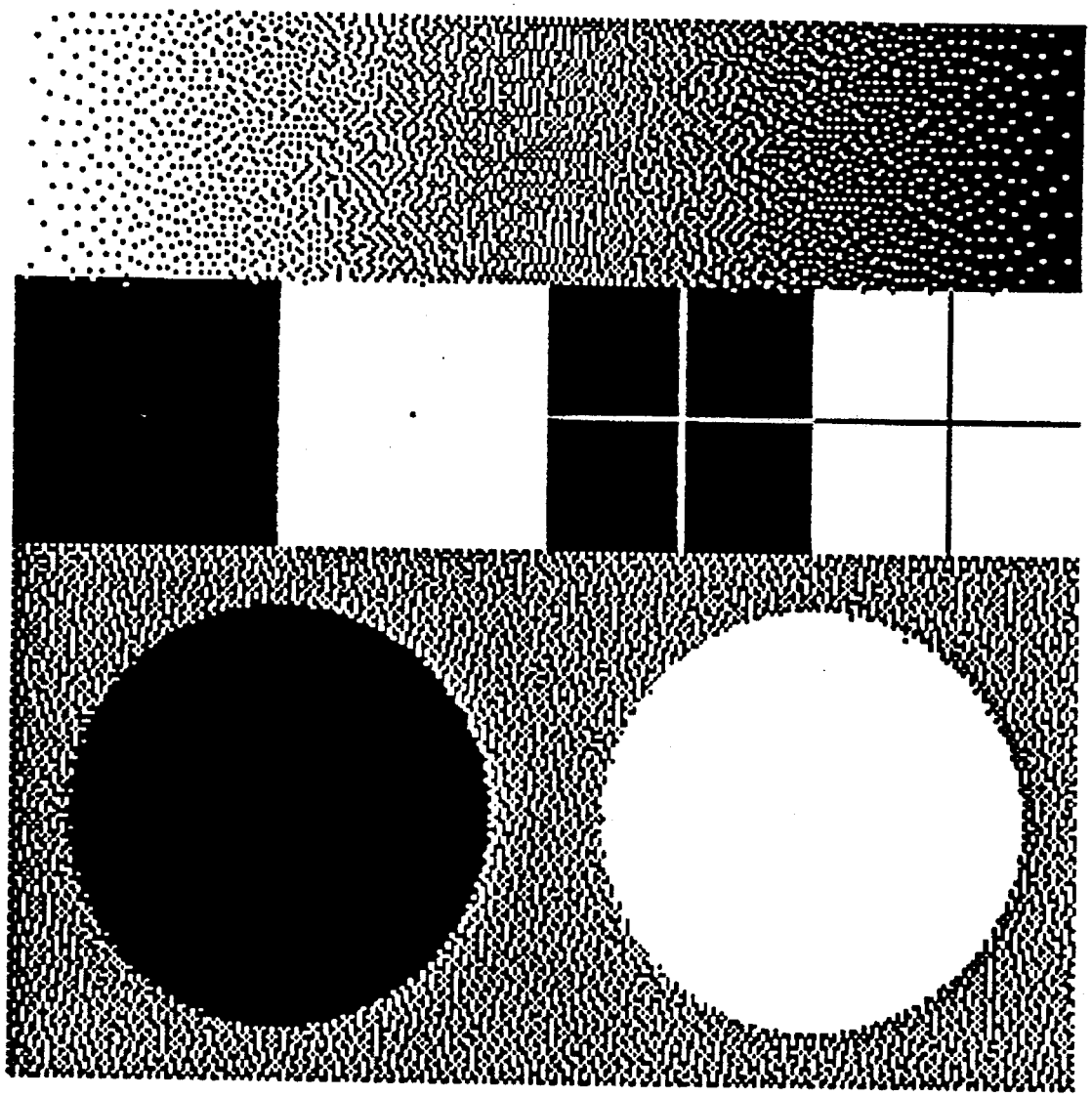
FIG. 9 depicts a sample image generated in accordance with the method of FIG. 8 which eliminates the artifacts of FIGS. 3 and 7.

FIG. 9 shows a representative sample image generated in accordance with the present invention. The 8×15 causal visual filter function shown in FIG. 6 was used to visually filter both the input and output pixels. It can be seen that the worms found in the conventional error diffusion have been eliminated as they were with Sullivan's visual error diffusion, but that the edge artifacts associated with that technique have been eliminated.

Figure 10:
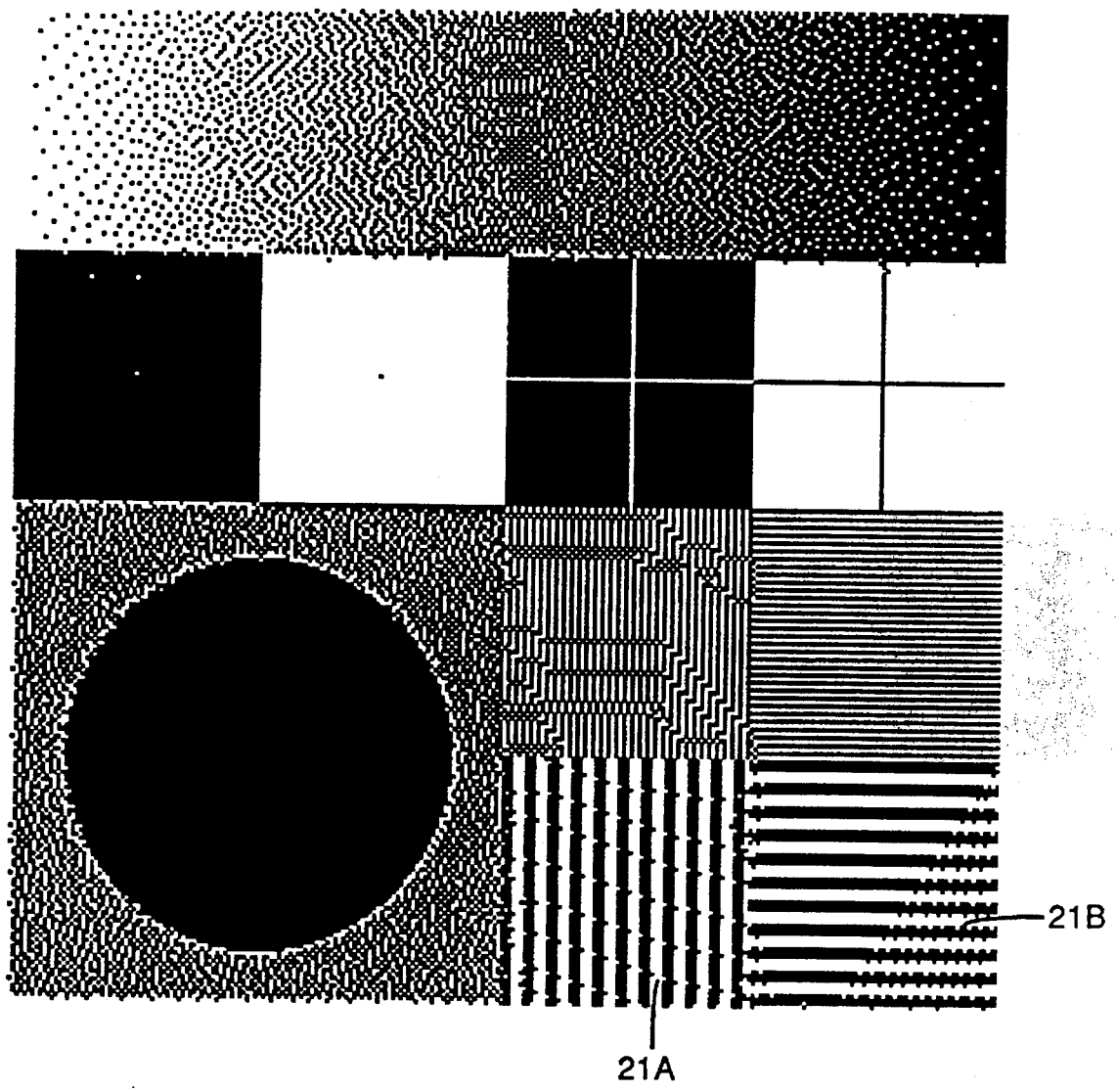
FIG. 10 is another logic diagram showing a method according to the present invention.
Figure 11:
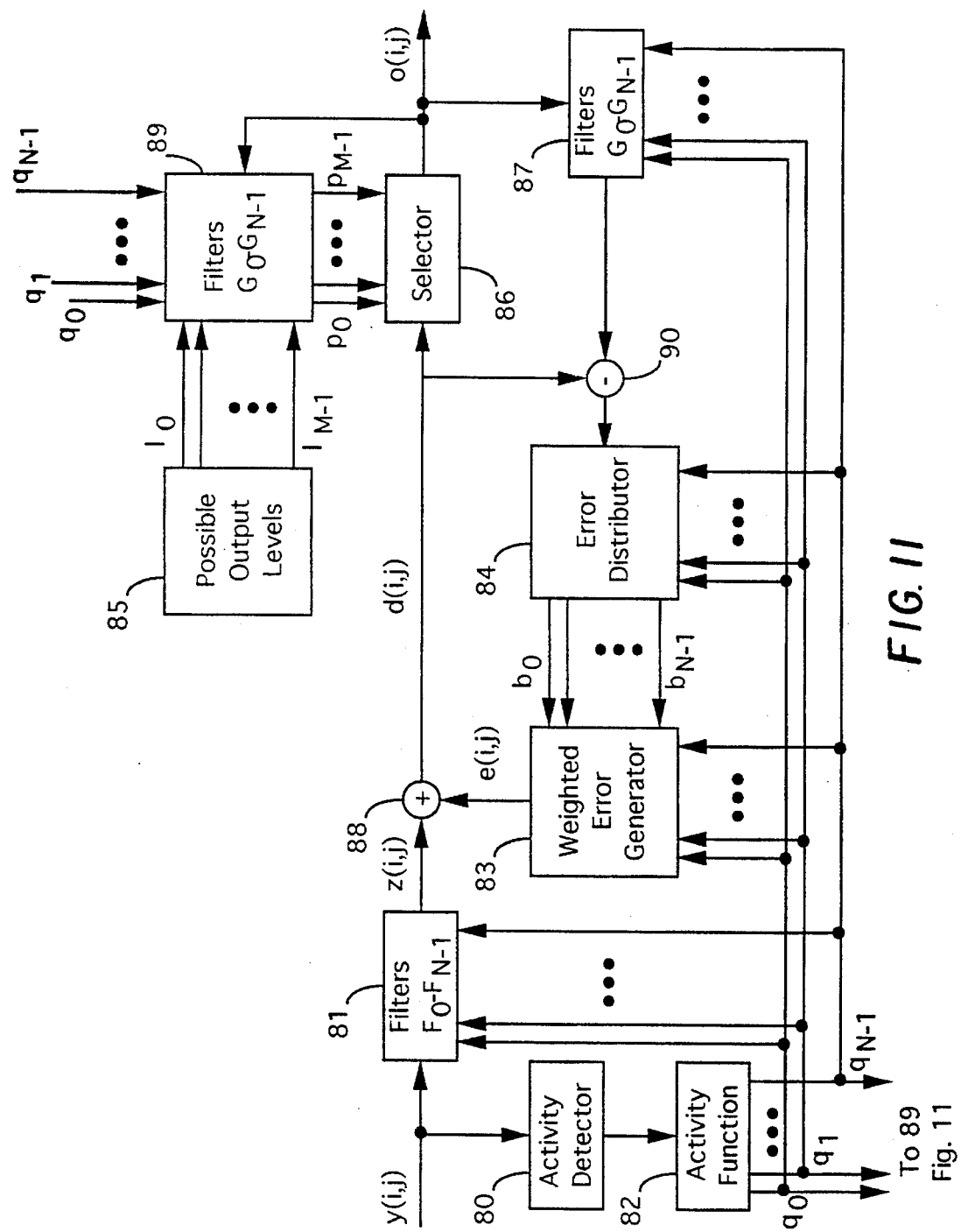
FIG. 11 depicts a sample sharpening filter which can be used in the logic of FIG. 10.
Figure 12:
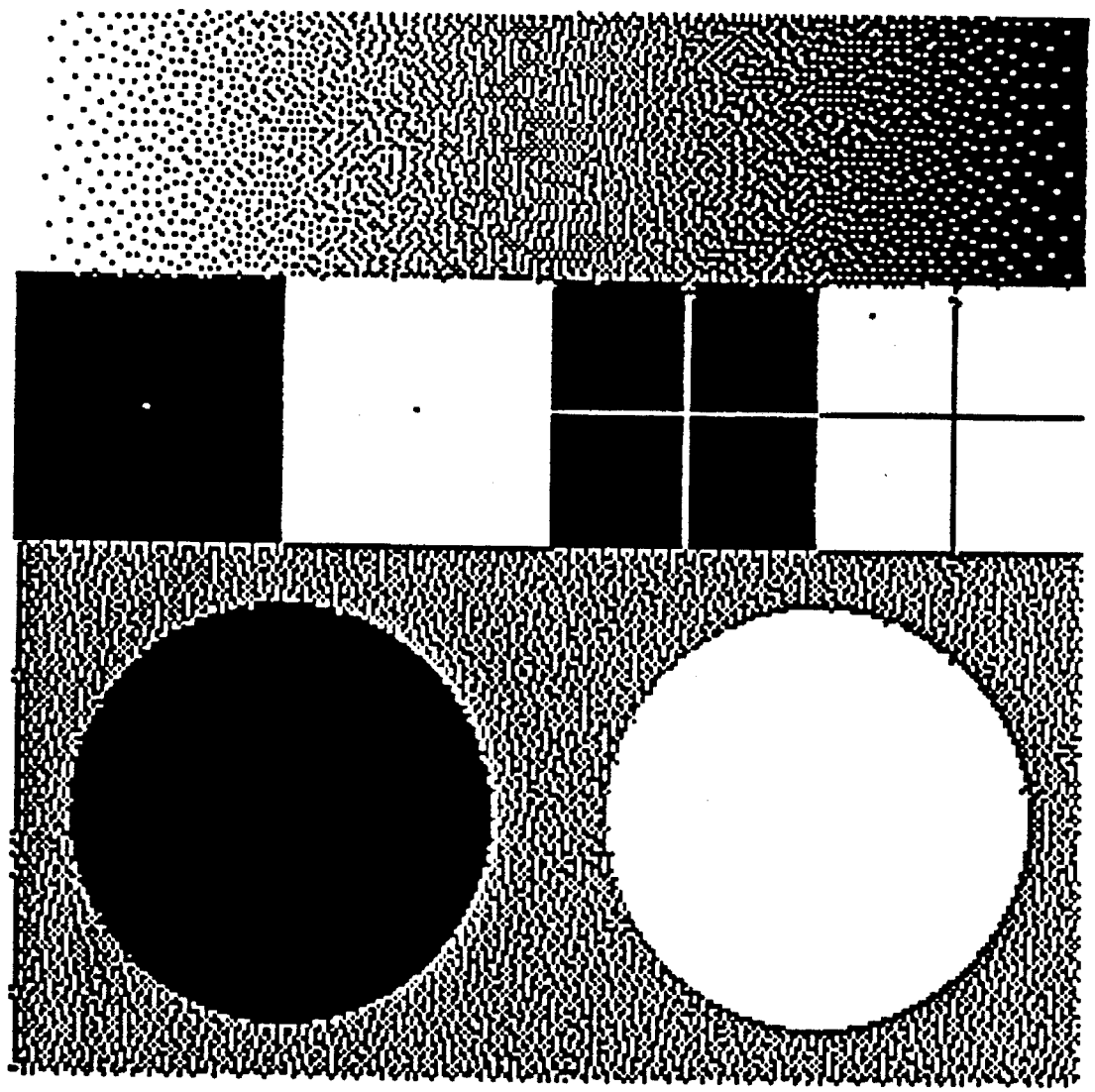
FIG. 12 depicts a sample image generated in accordance with the method of FIG. 10 which eliminates the artifacts of FIGS. 3 and 7.

Although the anisotropic sharpening effect caused by Sullivan's visual error diffusion system is undesirable in many respects, it does have the effect of increasing the overall image sharpness which can be a positive attribute in many cases. The use of the present invention will eliminate most of this sharpening effect. As a result an image generated with the present invention will be preferable from an artifact standpoint, but may appear quite soft relative to an image generated with the prior art technique. This can be compensated for by applying a sharpening filter to the continuous-tone input image prior to the application of the improved visual error diffusion system as shown in FIG. 10. The method of FIG. 10 is identical to that shown in FIG. 8 with the exception that a sharpening step 68 is applied to the continuous-tone input pixels before the application of the visual filter operation. The advantage of applying the sharpening as a separate step rather than simply using Sullivan's system is that the amount of sharpening can be easily controlled by adjusting the sharpening filter coefficients, and additionally the sharpening can be made to be more isotropic. The sharpening filter can be implemented as a simple convolution, or using other known techniques such as unsharp masking. A typical 3×3 sharpening filter which can be used for this purpose is shown in FIG. 11. Since both the sharpening step 68 and the visual filtering step 67 are sequential convolution operations which are applied to the continuous-tone input pixels, they can be combined into a single convolution operation where the convolution filter is formed by the convolution of the sharpening filter with the visual filter. In such a situation the visual filtering and sharpening can be accomplished simultaneously. FIG. 12 shows a sample image generated using the method of this invention shown in FIG. 10 with the sharpening filter shown in FIG. 11.

Figure 13:
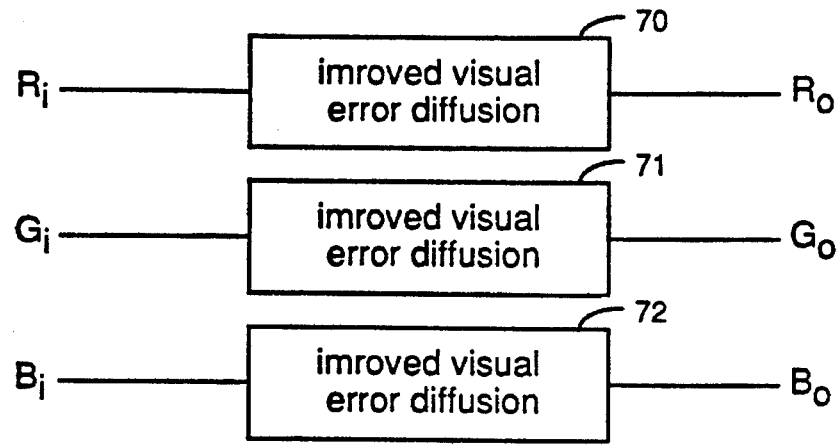
FIG. 13 is a logic diagram showing a method according to the present invention applied to each channel of a color image.

For color images, the method described above can be applied to each channel of the image. For example, if an image consists of red, green, and blue pixels, the improved error diffusion method can be applied via block 70 to the red pixels, and again to the green pixels and the blue pixels by block 71 and 72, respectively, as shown in FIG. 13. Similarly, the improved error diffusion method can be applied to each channel of a 4-color cyan, magenta, yellow and black image. It may be desirable to use different visual filters, error weights, and/or sharpening filters for each color channel.

Figure 14:
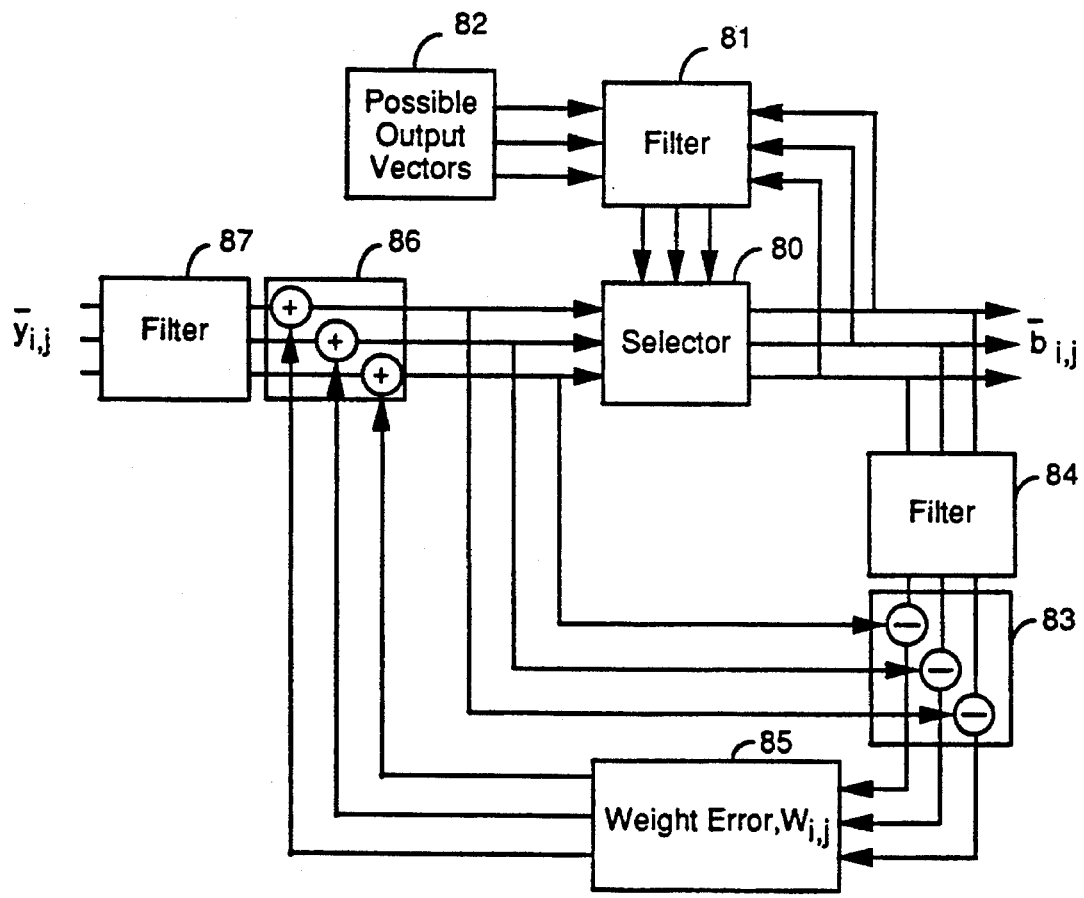
FIG. 14 is a logic diagram showing another method according to the present invention where error diffusion is applied simultaneously to all of the channels of a color image.

Alternatively, the color channels of a color image can be processed simultaneously. Error diffusion techniques which simultaneously process all of the color channels are sometimes referred to as "vector error diffusion" techniques. One embodiment of this type is shown in FIG. 14, and can be referred to as vector visual error diffusion. In the preferred embodiment of vector visual error diffusion there are three color channels: red, green, and blue. Therefore, the red, green and blue color values for a pixel make up a color vector. With reference to FIG. 14, it can be seen that this configuration is quite similar to the single channel case shown in FIG. 8, with the exception that visual filtering operations 81, 84 and 87, a selector 80, and a weighted error generator 85 operate on all of the color channels simultaneously. Thus they can be seen to be "vector operations" since they operate on a color vector.

A color visual filter 87 is used to compute the visually perceived input color vector given an input color vector $\bar{y}_{i,j}$ for the pixel at column i and row j of the image. The color visual filter 87 can consist of visual filters applied to each of the color channels independently, or simultaneously as a vector filter operation.

The selector 80 selects an output color vector from the set of all possible output color vectors according to an error criterion computed from the visually perceived input color vector and the set of all possible visually perceived output color vectors. The visually perceived output color vector is computed by applying a causal color visual filter 81 to the previously computed output vectors along with each of the possible output color vectors 82. One simple error criterion is to minimize the vector distance between the visually perceived input color vector and the visually perceived output color vector.

The resulting vector color error is then calculated by a vector difference signal generator 83 which computes the vector difference between the visually perceived input color value and the visually perceived output color value.

A weighted vector error generator 85 weights the vector error by a series of error weights $W_{i,j}$. The weighted vector error is then added by a vector adder 86 to the visually perceived input color vectors of nearby pixels which have not yet been processed.

The invention has been described in detail with particular reference to certain preferred embodiments thereof, but it will be understood that variations and modifications can be effected within the spirit and scope of the invention.

| Parts List | |
|---|---|
| 10 | threshold |
| 12 | difference signal generator |
| 14 | weighted error generator |
| 16 | adder |
| 18A | worm artifact |
| 18B | worm artifact |
| 18C | worm artifact |
| 19A | anisotropic sharpening of edges |
| 19B | anisotropic sharpening of edges |
| 20A | ghost pixels |
| 20B | ghost pixels |
| 20C | ghost pixels |
| 30 | selector |
| 31 | visual filter |
| 32 | set of possible output levels |
| 33 | difference signal generator |
| 34 | visual filter |
| 35 | weighted error generator |
| 36 | adder |
| 40 | array element |
| 42 | array element |
| 50 | selector |
| 51 | visual filter |
| 52 | set of possible output levels |
| 53 | difference signal generator |
| 54 | visual filter |
| 55 | weighted error generator |
| 56 | adder |
| 57 | visual filter |
| 60 | selector |
| 61 | visual filter |
| 62 | set of possible output levels |
| 63 | difference signal generator |
| 64 | visual filter |
| 65 | weighted error generator |
| 66 | adder |
| 67 | visual filter |
| 68 | sharpening step |
| 70 | improved visual error diffusion processor |
| 71 | improved visual error diffusion processor |
| 72 | improved visual error diffusion processor |
| 80 | selector |
| 81 | color visual filter |
| 82 | set of possible output vectors |
| 83 | vector difference signal generator |
| 84 | color visual filter |
| 85 | weighted vector error generator |
| 86 | vector adder |
| 87 | color visual filter |

We claim:

1. An improved error diffusion method for producing an output image from an input image having a set of digitized continuous-tone pixels, comprising the steps of:
   a) computing a visually perceived input value using a visual filter for a digitized continuous-tone input pixel;
   b) computing a visually perceived output value using a visual filter for each of the possible output levels;
   c) selecting the output level in response to the visually perceived input values and the visually perceived output value for each of the possible output levels according to an error criterion;
   d) determining an error signal between the visually perceived input value and the visually perceived output value for the selected output level; and
   e) weighting the error signal and adjusting the computed visually perceived input values for nearby pixels which have not been processed.

2. The method of claim 1 further including the step of sharpening the digitized continuous tone pixels prior to computing the visually perceived input values.

3. The method of claim 1 wherein the number of possible output levels is 2.

4. The method of claim 2 wherein the number of possible output levels is 2.

5. The method of claim 1 wherein the output level selection step uses an error criterion which selects the output level that results in the smallest difference between the visually perceived input value and the visually perceived output value.

6. The method of claim 2 wherein the output level selection step uses an error criterion which selects the output level that results in the smallest difference between the visually perceived input value and the visually perceived output value.

7. The method of claim 1 wherein the visually perceived input step also includes simultaneously sharpening the digitized continuous tone pixels.

8. The method of claim 1 wherein the step of computing the visually perceived input value and the step of computing the visually perceived output value are each accomplished by using causal visual filters.

9. The method of claim 8 wherein the same causal visual filters are used in each of the computing steps.

10. The method of claim 2 wherein the step of computing the visually perceived input value and the step of computing the visually perceived output value are each accomplished by using causal visual filters.

11. The method of claim 10 wherein the same causal visual filters are used in each of the computing steps.

12. An improved error diffusion method according to claim 1 further including providing a plurality of color channels and applying steps a) through e) to each color channel.

13. An improved error diffusion method according to claim 2 further including providing a plurality of color channels and applying steps a) through e) to each color channel.

14. An improved error diffusion method producing an output color image from an input color image with a plurality of color channels having a set of digitized continuous-tone pixels, comprising the steps of:
   a) computing a visually perceived input color vector using a visual filter for a digitized continuous-tone input pixel;
   b) computing the visually perceived output color vector using a visual filter for each of the possible output color vectors;
   c) selecting the output color vector in response to the visually perceived input color vector and the visually perceived output color vectors for each of the possible output color vectors according to an error criterion;
   d) determining a vector error signal between the visually perceived input color vector and the visually perceived output color vector for the selected output color vector; and
   e) weighting the vector error signal and adjusting the computed visually perceived input color vector for nearby pixels which have not been processed.

* * * * *